United States Patent [19]

Iwai et al.

[11] Patent Number: 4,876,665

[45] Date of Patent: Oct. 24, 1989

[54] DOCUMENT PROCESSING SYSTEM DECIDING APPARATUS PROVIDED WITH SELECTION FUNCTIONS

[75] Inventors: Isamu Iwai, Kawasaki; Toshio Okamoto, Bunkyo; Miwako Doi, Kawasaki, all of Japan

[73] Assignee: Kabushiki Kaishi Toshiba, Kawasaki, Japan

[21] Appl. No.: 947,091

[22] Filed: Dec. 29, 1986

[30] Foreign Application Priority Data

Apr. 18, 1986 [JP] Japan ............................... 61-88065

[51] Int. Cl.⁴ ..................... G06F 3/14; G06F 15/21; G06F 15/40; G06F 15/62
[52] U.S. Cl. .............................. 364/900; 364/920.6; 364/972; 364/975; 364/943; 364/943.44
[58] Field of Search ... 364/200 MS File, 900 MS File, 364/518

[56] References Cited

U.S. PATENT DOCUMENTS

| | | | |
|---|---|---|---|
| 4,193,119 | 3/1980 | Arase et al. | 364/900 |
| 4,358,824 | 11/1982 | Glickman et al. | 364/200 |
| 4,429,372 | 1/1984 | Berry et al. | 364/900 |
| 4,502,128 | 2/1985 | Okajima et al. | 364/900 |
| 4,503,515 | 3/1985 | Cuan et al. | 364/900 |
| 4,539,653 | 9/1985 | Bartlett et al. | 364/900 |
| 4,580,218 | 4/1986 | Raye | 364/300 |
| 4,601,003 | 7/1986 | Yoneyama et al. | 364/900 X |
| 4,604,712 | 8/1986 | Orrhammer | 364/900 |
| 4,610,025 | 9/1986 | Blum et al. | 382/9 |
| 4,631,531 | 12/1986 | Maeda | 340/701 |
| 4,633,430 | 12/1986 | Cooper | 364/900 |
| 4,663,615 | 5/1987 | Hernandez et al. | 340/721 |
| 4,710,885 | 12/1987 | Littekeu | 364/518 |
| 4,713,754 | 12/1987 | Agarwal et al. | 364/200 |
| 4,723,209 | 2/1988 | Hernandez et al. | 364/300 |

FOREIGN PATENT DOCUMENTS 0163503 5/1985 European Pat. Off. .
2043311A 3/1979 United Kingdom .
2043311 10/1980 United Kingdom .

OTHER PUBLICATIONS

W. Horak, Siemens AG, "Office Document Architecture and Office Document Interchange Formats: Current Status of International Standardization", Computer, No. 10 (Oct. 1985), pp. 50–60.

Gary D. Kimura, "A Structure Editor for Abstract Document Objects", IEEE Transactions on Software Engineering, vol. SE-12, No. 3, Mar. 1986, pp. 417–435.

Primary Examiner—Archie E. Williams, Jr.
Assistant Examiner—Robert B. Harrell
Attorney, Agent, or Firm—Foley & Lardner, Schwartz, Jeffery, Schwaab, Mack, Blumenthal & Evans

[57] ABSTRACT

A document processing apparatus has a heading word dictionary, a heading extractor, a heading rule dictionary, a heading decision section, a document architecture rule dictionary and, a document architecture decision section, for deciding a logical document architecture. The apparatus further comprises a rule application decision section and a candidate selection indication section to allow the operator to select any desired document architecture, when the document architecture decision section decides plural document architecture candidates exist in accordance with document architecture rules, thus improving the operability of the system. Further, the past rule application record information (priority order) is stored and updated so as to provide a learning function for providing better operability.

3 Claims, 13 Drawing Sheets

FIG. 2
DOCUMENT SAMPLE

```
LINE
 1    Document understanding system  ◯
 2    Okawa Taro  ◯
 3    1. Introduction  ◯
 4    Recently, natural languages are ........
 5    ........................
 6    2. Features of system  ◯
 7    ①. Good operability  ◯
 8    ②. High recognition rate  ◯
 9    This system is .......  ◯
10    3. System configuration  ◯
11    ........................  ◯
```

FIG. 3

HEADING WORD DICTIONARY

| CATEGORY | | DICTIONARY ITEM |
|---|---|---|
| RESERVED HEADING WORD | | INTRODUCTION ABSTRACT ⋮ |
| SYMBOL PORTION | | § ☆ ⋮ |
| NUMERIC PORTION | GENERAL | 1 2 ⋮ |
| | ENCIRCLED NUMERAL | ① ② ⋮ |
| | ROMAN NUMERAL | I II ⋮ |
| | ⋮ | |
| TAIL SYMBOL | | ... ⋮ |
| PUNCTUATION PORTION | | . . ⋮ |
| ⋮ | | |

FIG. 4B
HEADING RULE b

FIG.4C
HEADING RULE c

HEADING WORD:
(PROPER NOUN)
(≦ 40 CHARACTERS)
→ [ANY CHARACTERS EXCLUDING SPACES] → [ANY CHARACTERS EXCLUDING SPACES] (RESERVED HEADING AFFIX WORD) → (HEADING CANDIDATE WORD)

FIG.4D
HEADING RULE d

ALPHANUMERIC PORTION → (NUMERIC PORTION) → [SPACE] (RESERVED WORD) → [SPACE] (ALPHANUMERIC PORTION) → (ALPHANUMERIC PORTION)(GREEK LETTER PORTION) → [SPACE] (NUMERIC PORTION) → (GREEK LETTERS) → (RUSSIAN LETTERS)

| LINE NUMBER | ATTRIBUTE | LEVEL | HEADING PATTERN |
|---|---|---|---|
| 1 | TITLE | 1 | Null |
| 2 | AUTHOR | 1 | Null |

FIG.6B

| LINE NUMBER | ATTRIBUTE | LEVEL | HEADING PATTERN |
|---|---|---|---|
| 1 | TITLE | 1 | Null |
| 2 | AUTHOR | 1 | Null |
| 3 | CHAPTER HEADING | 1 | [NUMERIC (GENERAL)] + [PUNCTUATION PORTION] + HEADING<br>ORDER 1 |

FIG.6C

| LINE NUMBER | ATTRIBUTE | LEVEL | HEADING PATTERN |
|---|---|---|---|
| 1 | TITLE | 1 | Null |
| 2 | AUTHOR | 1 | Null |
| 3 | CHAPTER HEADING | 1 | [NUMERIC (GENERAL) PORTION] + [PUNCTUATION PORTION] + HEADING<br>ORDER 1 |
| 4~5 | PARAGRAPH | 1 | Null |
| 6 | CHAPTER HEADING | 1 | [NUMERIC (GENERAL) PORTION] + [PUNCTUATION PORTION] + HEADING<br>ORDER 2 |

FIG. 6D

| LINE NUMBER | ATTRIBUTE | LEVEL | HEADING PATTERN |
|---|---|---|---|
| 1 ～ 7 | TITLE<br>ITEMIZED HEADING | 1<br>～<br>2 | Null<br>[NUMERIC PORTION] + BLANK + HEADING WORD<br>ORDER 1 |
| 8 | ITEMIZED HEADING | 2 | [NUMERIC PORTION] + BLANK + HEADING WORD<br>ORDER 2 |

FIG.6E

| LINE NUMBER | ATTRIBUTE | LEVEL | HEADING PATTERN |
|---|---|---|---|
| 1 ∼ 8 | TITLE ∼ ITEMIZED HEADING | 1 ∼ 2 | Null ∼ [NUMERIC PORTION] + BLANK + HEADING WORD  ORDER 2 |
| 9 | PARAGRAPH | 2 | Null |

FIG.6F

| LINE NUMBER | ATTRIBUTE | LEVEL | HEADING PATTERN |
|---|---|---|---|
| 1 ∼ 6 | TITLE ∼ CHAPTER HEADING | 1 ∼ 1 | Null ∼ [NUMERIC(GENERAL)] + [PUNCTUATION PORTION] + HEADING  ORDER 2 |
| ∼ 8 | ITEMIZED HEADING | 2 | [NUMERIC PORTION] + BLANK + HEADING WORD  ORDER 2 |
| 9 | PARAGRAPH | 1 | Null |

STORED RULE TABLE

| RULE NAME | CONT. NAME | APPLIED FLAG | PAST RECORD |
|---|---|---|---|
| (d)CONJUNC-TION | CONDITION 2-1($d_1$) | ON | $Y_1$ |
| | 2-2($d_2$) | OFF | $Y_2$ |
| ⋮ | ⋮ | ⋮ | ⋮ |

FIG. 9

RULE APPL. DECISION FLOW

DOCUMENT PROCESSING SYSTEM DECIDING APPARATUS PROVIDED WITH SELECTION FUNCTIONS

BACKGROUND OF THE INVENTION (1) Field of the Invention

The present invention relates generally to a document processing apparatus, and more specifically to a document processing apparatus which can form a logical document architecture with respect to chapters, itemized statements, paragraphs, etc. of a document.

(2) Description of the Prior Art

In general, a document is divided into a plurality of blocks, and headings are assigned to the respective blocks to facilitate reading of the document. Further, each block is divided into subblocks, and subheadings are assigned to the respective subblocks. The headings and subheadings are composed of short sentences, and additionally heading symbols are often added to these introductory portions, for instance, such as "Chapter 1" or "Section 3", respectively. When documents having the hierarchical structure as described above are processed by a computer, the following problem arises: In the conventional document processing systems, since document data are processed in units of frames on the display or of pages of printing sheets, where a given chapter is required to be replaced with another, both the start and end positions of the document data to be moved elsewhere should be designated by the cursor. In this case, if the document data of the any given chapter is long, the display screen must be scrolled many times from the start position to the end position to be designated. The above screen scrolling is troublesome and tends to result in operational errors.

When an operator drafts a document, he often wishes to see the previous sentences, for instance, to check the contents of the previous sentences and the kinds of the previous heading symbols. In this case, he must guess the page and the position of the line which include the required sentence and heading symbol to be checked, and thereafter must search the desired sentence and heading symbol. The above search operation is troublesome and therefore the document drafting efficiency is greatly degraded.

To solve the above-mentioned problem, the same applicant and the same inventors have already filed a novel document processing apparatus which comprises document data inputting means; heading dictionary means; heading rule dictionary means; heading deciding means; document architecture rule dictionary means; and document architecture deciding means.

The above document processing apparatus can prepare a logical document hierarchical architecture list by handling documents in units of items in order that the operator can readily designate any given headings, itemized statements, paragraphs for easy document editing.

In the above document processing apparatus, however, since document architecture is decided in accordance with only the document architecture dictionary, there exists a problem such that heading is decided erroneously. For instance, a heading "2.2 Class Training" can be decided as an addition of "2.2" (Heading Symbol) and "Class Training" (Heading Word) or of "2" (Heading Symbol) and "2 class Training" (Heading Word). Further, where itemized statement of "1 . . . ", "2 . . . ", "3 . . . ", and "4 . . . " exist under a chapter heading "4 . . . " and further "5 . . . " follows, the "5 . . . " can be decided as a chapter heading or an itemized heading.

Therefore, when the document architecture univocally decided by the computer is different from that intended by the user, the user should modifly the document architecture to an intended one, thus resulting in maloperability.

SUMMARY OF THE INVENTION

With these problems in mind, therefore, it is the primary object of the present invention to provide the document processing apparatus with an additional function such that a plurality of document architecture candidates can be decided and the operator can readily select any one of desired candidate for providing a better operability.

To achieve the above-mentioned object, the document processing apparatus according to the present invention comprises:

a unit for inputting document data; heading dictionary unit for storing words and phrases frequently used as a heading; heading candidate extraction unit for extracting, as a heading candidate, the word and phrase corresponding to the heading stored in said heading dictionary unit from the document data input through said input unit; heading rule dictionary means for storing rules for deciding the headings; heading deciding unit for checking the heading candidate extracted by said heading candidate extracting unit in accordance with the heading rule stored in said heading rule dictionary unit and for deciding whether the heading candidate is a heading; document architecture rule dictionary unit for storing rules associated with document logical architectures; document architecture deciding unit for deciding the document architecture of a heading decided by said heading deciding unit and the sentence decided as a non-heading in accordance with document architecture rules stores in said document architecture rule dictionary unit; and, in particular, document architecture selecting and indicating unit for allowing an operator to select a desired document architecture when the document architecture deciding unit decides a plurality of document architecture candidates in accordance with document architecture rules.

The document architecture selecting and indicating unit comprises rule application deciding unit and candidate selecting and indicating unit. The rule application deciding unit is accessible to the document architecture rule dictionary to check a rule name requesting candidate selection and to retrieve flags corresponding to the rule name from a table. The candidate selecting and indicating unit is accessible to a candidate selecting key provided in the document input unit to update flags so that any desired document architecture can be selected.

Further, the document architecture rule dictionary stores rule application record information indicative of past rule application situations, and the document architecture deciding unit decides an architecture rule to be applied with reference to the stored rule application record information. The above record information can be updated.

DETAILED DESCRIPTION OF THE PREFERRED EMBODIMENT

Figure 1:
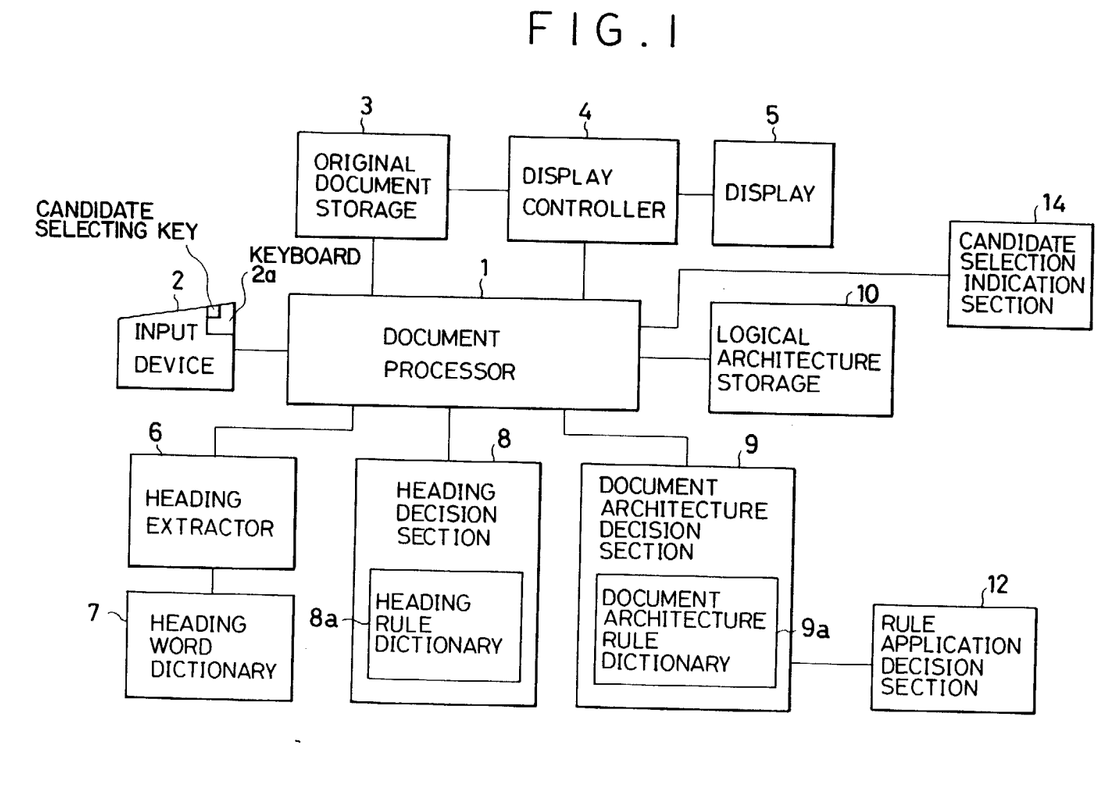
FIG. 1 is a block diagram of the document processing apparatus according to the present invention.

With reference to the attached drawings, the document processing apparatus according to the present invention will be described in detail hereinbelow:

With reference to FIG. 1, a document processor 1 is connected to an input device 2 including a keyboard 2a for achieving centralized handling and processing input documents. The document processor 1 is also connected to an original document storage 3 for storing input original documents and to a display controller 4 for causing a display 5 to indicate the input original document read out from the storage 3. The document processor 1 is furhter connected to a heading extractor 6, a heading decision section 8, a document architecture decision section 9, and a logical architecture storage 10. The heading extractor 6 is connected to a heading word dictionary 7 for storing many types of words representative of headings. The heading decision section 8 includes a heading rule dictionary 8a. The document architecture decision section 9 includes a document architecture rule dictionary 9a.

The document processor 1 sequentially detects document data segmentation codes stored in the original document storage 3, for example, such as a line return code, and extracts sentences segmented by the segmentation code. In this case, the document processor 1 measures each sentence length. The extracted sentences are sequentially sent to the heading extractor 6. The heading extractor 6 decides the heading word by comparison of the input sentence with heading words stored in the heading word dictionary 7, and the sentence length.

Figure 3:
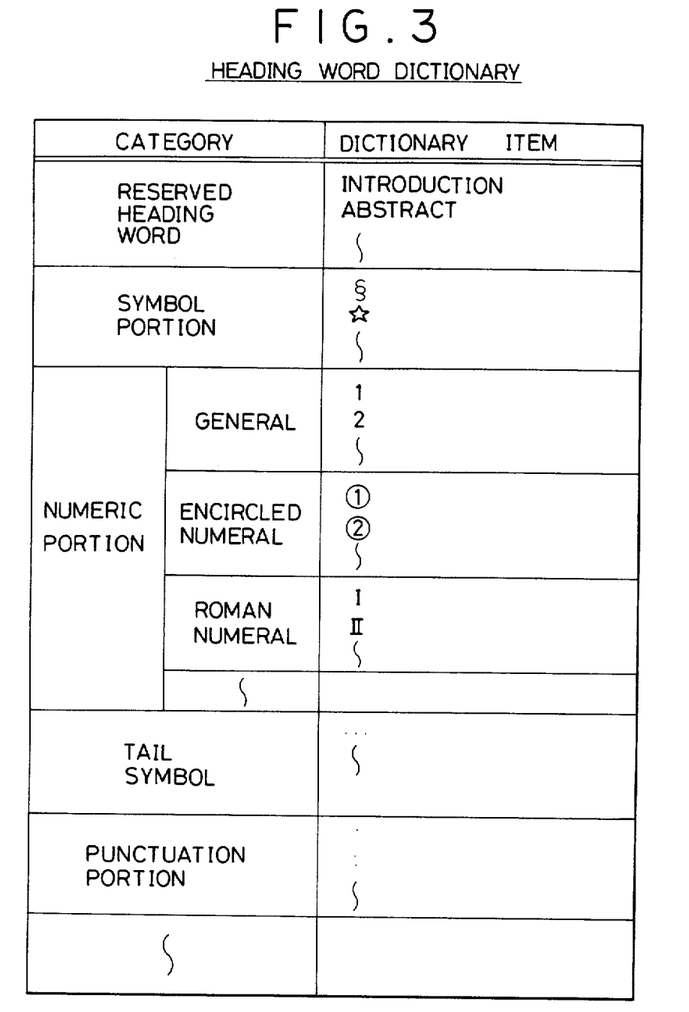
FIG. 3 is an examplary heading word dictionary.
Figure 4A:
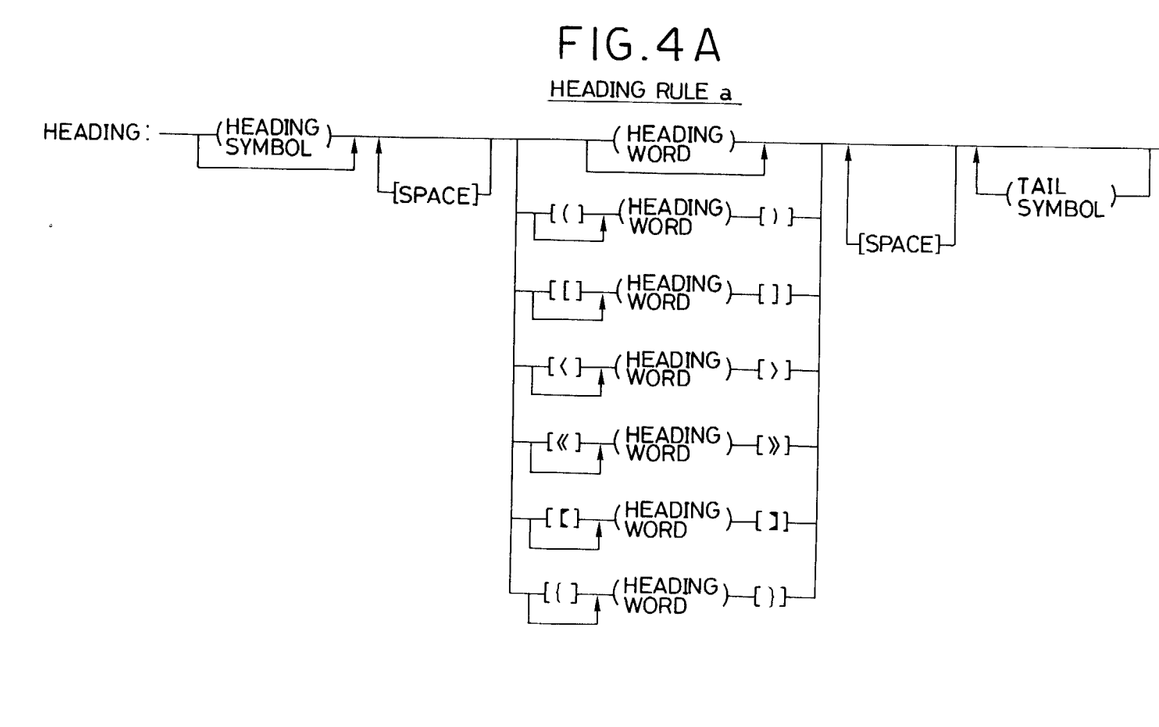
FIGS. 4A to 4D are an examplary heading rule dictionary.
Figure 4B:
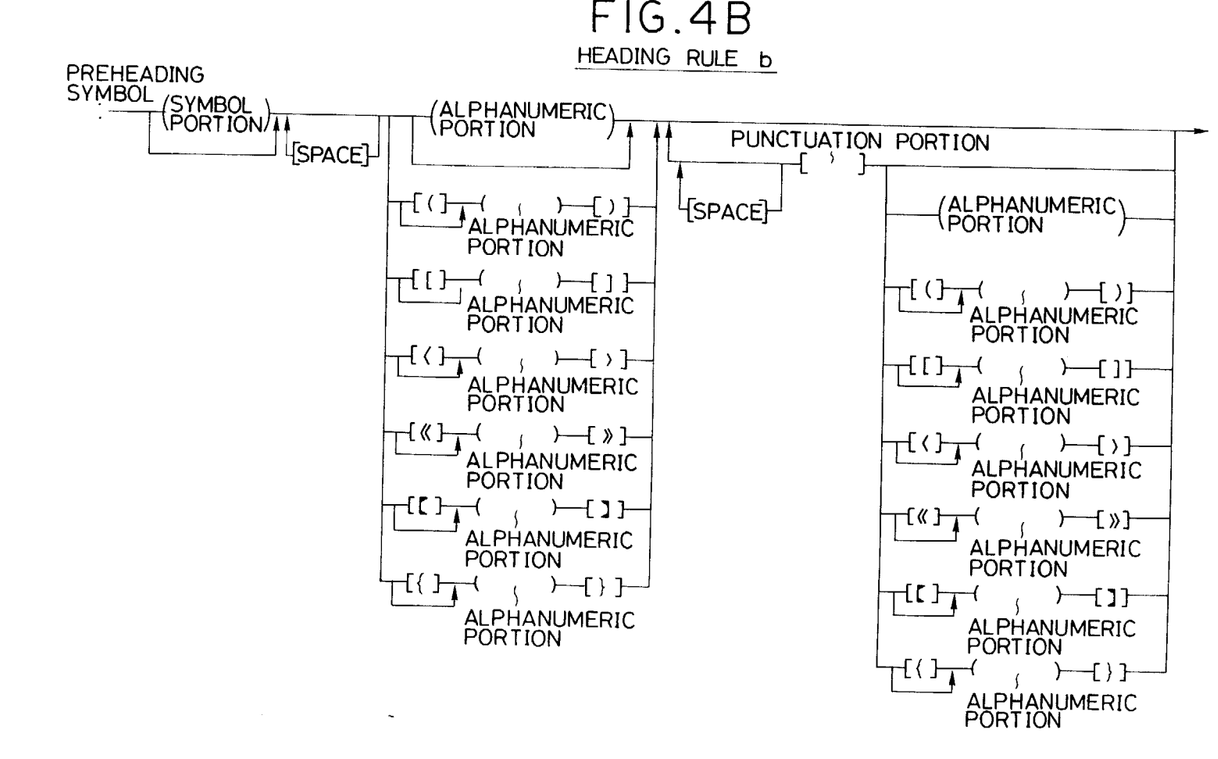
Figure 4C:
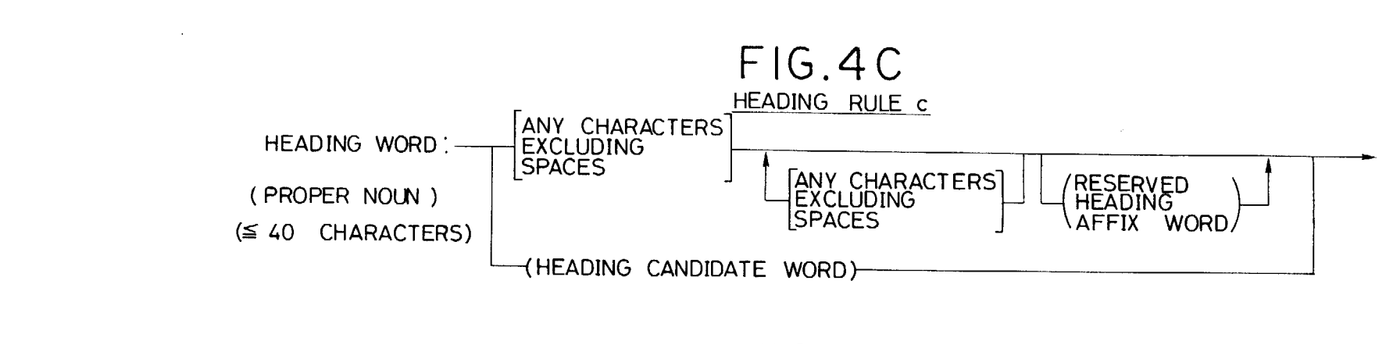
Figure 4D:
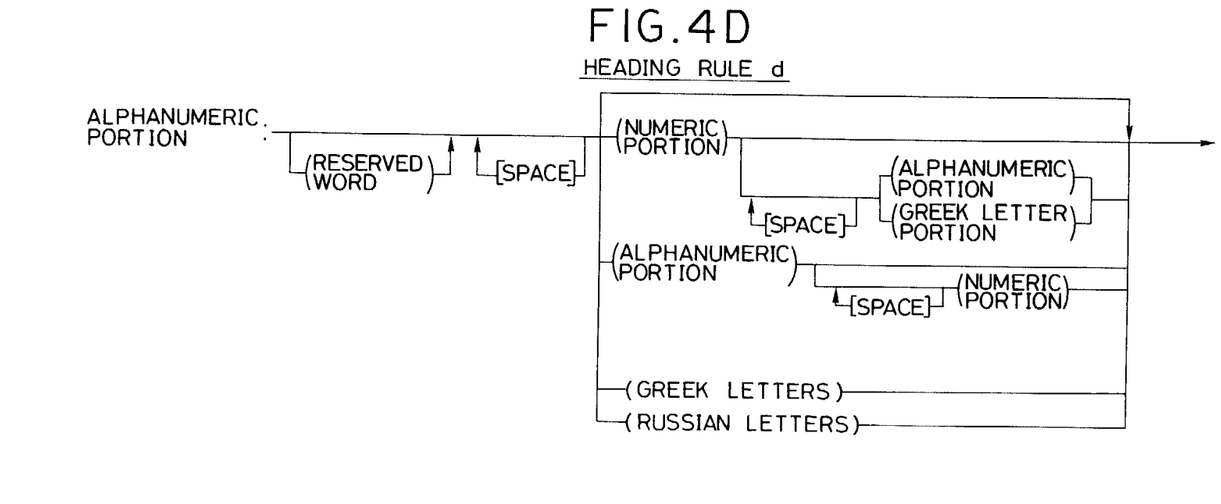

The heading word dictionary 7 stores frequently used words, phrases and symbols, all of which are defined as heading words. The words, phrases and symbols are classified into categories, as shown in FIG. 3, and are registered in advance in the dictionary 7. Words such as "introduction" and "abstract" are registered in a category of "reserved heading word". In addition, frequently used numerals and symbols are also registered as heading words being classified into the respective categories.

The heading extractor 6 decides whether the number of characters of an extracted sentence is less than a predetermined number. In other words, the extractor 6 decides whether an extracted heading word (a word and/or phrase, and/or numeral and/or symbol represented as a code string) corresponds to one of the words registered in the dictionary 7. If a correspondence is detected, the extracted word is recognized as the corresponding heading word.

The extracted words decided by the extractor 6 as being the heading word are input, one by one, to the heading decision section 8, under the control of the processor 1. The heading decision section 8 decides, in accordance with the heading rules (FIGS. 4A to 4D) stored in the dictionary 8a, whether the recognized heading word is a heading word or another word.

The word discriminated as the heading word or any other word by the heading decision section 8 is input to the document architecture decision section 9 under the control of the processor 1. The architecture decision section 9 decides whether the sentence or word sent from the heading decision section 8 is a chapter heading, a section heading, or a paragraph, in accordance with the document architecture rules (shown below) stored in the document architecture rule dictionary 9a:

TABLE 1

| Rules for Heading | |
| --- | --- |
| Condition 1: | A reserved word is not included. |
| Condition 1-1: | A heading word is included. |
| Condition 1-1-1: | A reserved heading word is included. |
| Condition 1-1-1-1: | A chapter heading is not included in the previous part. |
| (Result) | Indicates a chapter heading. |
| → | A symbol portion, an alphanumeric portion, a punctuation portion, or a tail sysmbol is defined as a main heading pattern. |
| Condition 1-1-2: | A reserved heading word is not included. |
| Condition 1-1-2-2: | A chapter heading is present in the previous part. |
| Condition 1-1-2-2-1: | Matching with a chapter heading pattern is successful. |
| (Result) | Indicates a chapter heading. |
| → | The order of the chapter heading pattern is incremented by one. |
| Condition 1-1-2-2-2: | This heading pattern does not match the previous chapter heading. |
| Condition 1-1-2-2-2-1: | An itemized pattern is not present in the previous part. |
| (Result) | Indicates an itemized pattern candidate. |
| Condition 1-1-2-2-2-2: | An itemized pattern is present in the previous part. |
| Condition 1-1-2-2-2-2-1: | This heading pattern matches the itemized pattern candidate. |
| (Result) | Indicates an itemized pattern. The order of the itemized pattern is incremented by one. |

TABLE 2

| Rules for Matching with Heading Patterns | |
| --- | --- |
| Condition 1-1: | An alphanumeric portion is included. |
| Condition 2-1: | Alphanumeric portion are the same kind. |
| Condition 3-1: | The order of the alphanumeric portion is higher by one than that of a heading pattern. |
| Condition 4-1: | A symbol portion, factors excluding the order of an alphanumeric portion, a punctuation portion, a tail symbol, and the presence/absence of parentheses in the heading word are the same as those of the heading pattern. |
| (Result) | Indicates successful matching. |
| Condition 4-2: | A symbol portion, factors excluding the order of an alphanumeric portion, a punctuation portion, a tail symbol, and the presence/absence of parentheses in the heading word are the same within the range of the error pattern rules. |
| (Result) | Indicates successful matching. |

TABLE 2-continued

Rules for Matching with Heading Patterns

| | |
|---|---|
| Condition 4-3: | A symbol portion, factors excluding the order of an alphanumeric portion, a punctuation portion, a tail symbol, and the presence/absence of parentheses in the heading word are not the same as those of the heading pattern. |
| (Result) | Indicates failure matching. |
| Condition 3-2: | The order of the alphanumeric portion is equal to or incremented by two from the order of the heading pattern. |
| Condition 4-1: | A symbol portion, factors excluding the order of an alphanumeric portion, a punctuation portion, a tail symbol, and the presence/absence of parentheses in the heading word are the same within the range of the error pattern rules. |
| (Result) | Indicates successful matching |
| Condition 4-2: | A symbol portion, factors excluding the order of an alphanumeric portion, a punctuation portion, a tail symbol, and the presence/absence of parentheses in the heading word are not the same as those of the heading pattern. |
| (Result) | Indicates failure matching. |
| Condition 1-2: | An alphanumeric pattern is not included. |
| Condition 2-1: | A symbol portion, factors excluding the order of an alphanumeric portion, a punctuation portion, a tail symbol, and the presence/absence of parentheses in the heading word are the same as those of the heading pattern. |
| (Result) | Indicates successful matching. |
| Condition 2-2: | A symbol portion, factors excluding the order of an alphanumeric portion, a punctuation portion, a tail symbol, and the presence/absence of parentheses in the heading word are not the same as those of the heading pattern. |
| (Result) | Indicates failure matching. |

TABLE 3

Paragraph Associated Format

| | |
|---|---|
| Condition 1-1: | A heading is not included. |
| (Result) | Indicates a paragraph. |

TABLE 4

Conjunction Associated Format

| | |
|---|---|
| Condition 1-1: | A paragraph. Access rule application decision section |
| Condition 2-1: (Result $d_1$) | Applied flag information is X1. Set the level of the current heading to the same as that of the previous heading. |
| Condition 2-2: (Result $d_2$) | Applied flag information is X2. Set the level of the current heading to the same as that of the previous chapter heading. |

The logical architecture of a sentence or word, as determined by the document architecture decision section 9 in accordance with the above rules, is stored in the logical architecture storage 10.

The display controller 4 controls the display 5 to display the document data according to the document logical architecture stored in the logical architecture storage 10.

Figure 2:
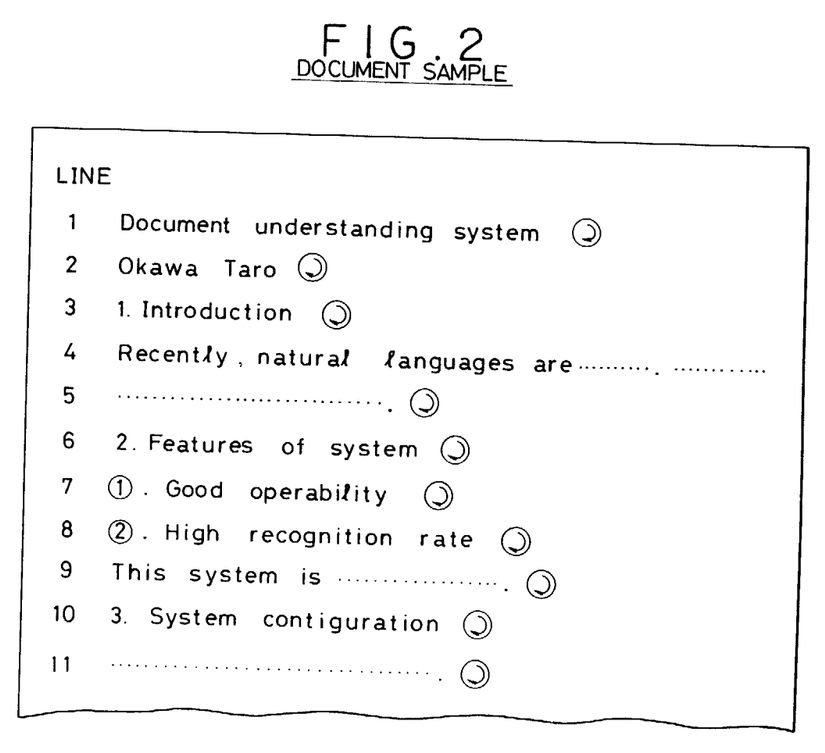
FIG. 2 is an example of documents.

The operation of the document processing apparatus will now be described with reference to the flow chart shown in FIG. 5. When document data is input to the input device 2 (step a), the input document data is sequentially stored in the original document storage 3. At the same time, the input document data is segmented into a plurality of blocks by the document processor 1, as shown in FIG. 2. In this segmentation processing, a line return codes etc. are determined as segmentation codes. The input document data is segmented in units of blocks at the segmentation codes. In this case, the segmentation sentence length is measured by counting characters. If the measured value falls within a predetermined value (e.g., 40 characters), the sentence is determined as having the possibility of being a heading sentence.

If the segmented sentence is determined as having the possibility of being a heading sentence according to the measured number of characters, the heading extractor 6 decides whether a character string (words, phrases, or symbols) constituting the segmented sentence is registered in the heading word dictionary 7 (step b). For example, when the sentence "1. Introduction" in the input document data is extracted, it is checked as to whether it is registered in the heading dictionary 7. In this case, "1", "." and "Introduction" are retrieved from the heading dictionary 7, and the sentence is determined as being a heading candidate A (step c).

When a heading candidate decision is performed, the heading decision section 8 accesses the heading rule dictionary 8a to determine whether the candidate A is a heading word (step d). If the candidate A is defined by any one of the rules shown in FIGS. 4A to 4D, the candidate A is determined as being heading word B (step e). In this case, the type of heading word is determined according to the applied heading rule.

If the sentence segmented by the document processor 1 does not correspond to any heading word registered in the dictionary 7, or if the segmented sentence does not coincide with any heading rule although it is determined as being a heading candidate word, the segmented sentence is determined as being a sentence not included in the heading word rules (step f).

The sentence determined as being a heading word, and the sentence determined as not being a heading word are input to the document architecture decision section 9 in order to determine their document architecture. When the document architectures are determined, the decision section 9 determines whether the sentence architectures correspond to document architecture rules (Tables 1 to 4) stored in the rule dictionary 9a (step g). If the architecture of the input document is defined by one of the document architecture rules, the document architecture data corresponding to the determined rule is stored in the storage 10 (step h and i).

With reference to the example of segmented sentences as shown in FIG. 2, the above method of determining the document architecture will be described in further detail. In the segmented sentences in FIG. 2, the sentence of the first line, i.e., "document understanding system", and the sentence of the second line, i.e., "Okawa Taro" are not stored in the dictionary 7. These sentences are decided by the extractor 6 not to be heading words. However, the sentence of the first line is defined by a rule representing a noun phrase appearing at the head of the document, and the decision section 9 decides that "document understanding system" is a title. The sentence of the second line, "Okawa Taro" is a proper noun representing a male name. Since the male name follows the title, the name is determined as being an author's name.

The results obtained by the document architecture decision as described above are stored in a form, as shown in FIG. 6A, in logical architecture storage 10.

In the sentence of the third line, i.e., "1. Introduction", three words, i.e., "1", ".", and "Introduction" are stored in the dictionary 7. Therefore, this sentence is determined as being a heading candidate sentence A1 (See FIG. 7A). At the same time, the categories constituting this sentence are recognized as a numeric portion, a punctuation portion, and a heading candidate word, respectively.

Figure 7A:
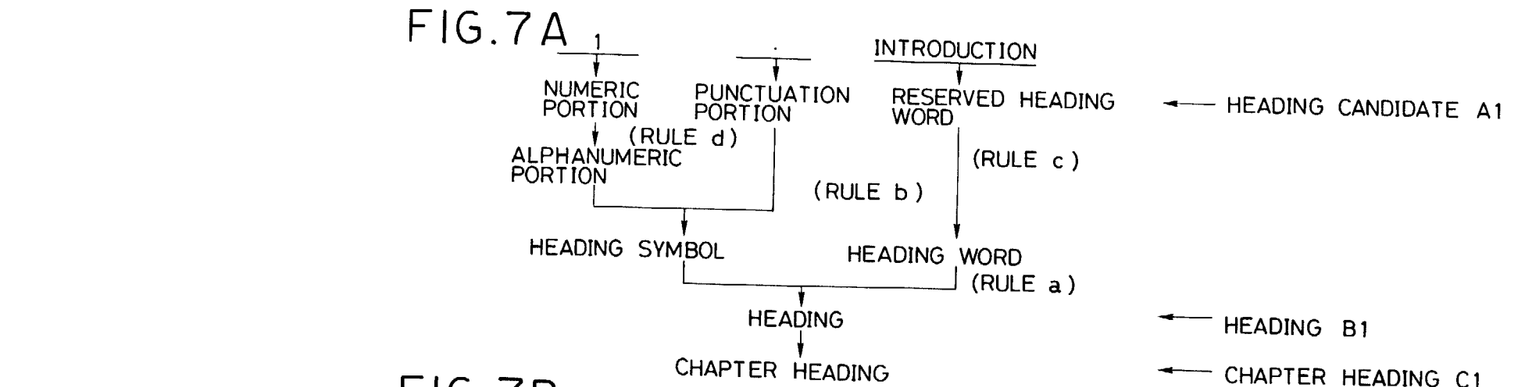
FIGS. 7A to 7C show few examples of application of heading rules shown in FIGS. 4A to 4D to the document shown in FIG. 2.

The heading decision section 8 accesses the heading rule dictionary 8a to determine whether the sentence determined as being heading candidate A1 is defined by the heading rules. In this case, the order of the categories constituting candidate word A1 is analyzed. The decision section 8 determines whether the order satisfies any one of the conditions in FIGS. 4A to 4D. The first numeral "1" is defined by the rule d shown in FIG. 4D. The numeral "1" and punctuation portion "." are defined by the rule b shown in FIG. 4B. Therefore, "1." is determined as being a heading symbol according to the rule b shown in FIG. 4B. "Introduction" is defined by the rule c shown in FIG. 4C, and is determined as being a heading word. The relationship between the heading symbol and the heading word is defined by the rule a shown in FIG. 4A. The heading candidate A1 is thus decided as heading B1. The above decision process is shown in FIG. 7A.

In the above decision process, if the categories are not defined by the rules a, b, c, d shown in FIGS. 4A to 4D, heading candidate A1 is determined as not being a heading word.

Figure 6A:
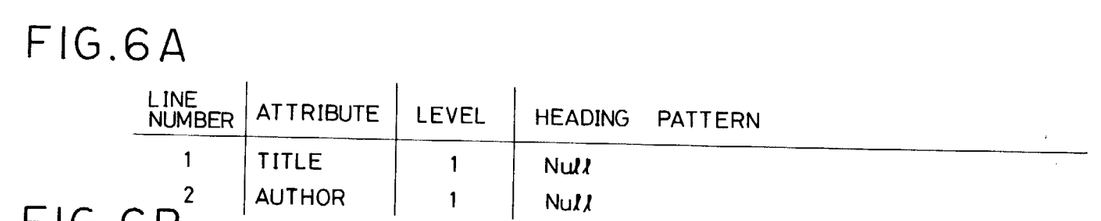
FIGS. 6A to 6F show an examplary sequence of logical document architecture lists stored in the logical architecture storage.
Figure 6B:
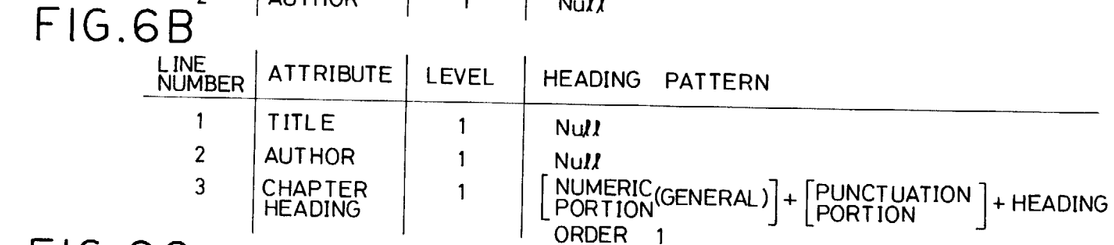

The document architecture decision section 9 determines the document architecture of heading B1 in accordance with the rules in table 1 to 4. In this case, the logical architecture of the analyzed sentence is stored in the storage 10, as shown in FIG. 6A. No chapter heading is indicated in the stored logical architectures. Heading B1, i.e., "1. Introduction" is defined by conditions (1), (1-1), (1-1-1), and (1-1-1-1) in Table 1 so that "1. Introduction" is determined constituting chapter heading C1 as shown in FIG. 7A. According to this decision, the logical architecture containing the chapter heading is stored in the logical architecture storage 10, as shown in FIG. 6B.

Since the number of characters of the sentence of the fourth and fifth lines shown in FIG. 2 exceeds the number for determining the possibility of a sentence being a heading word, this sentence is therefore determined as being other than a heading. As defined by the rule in Table 3, the sentence of the fourth and fifth lines is determined as being a sentence constituting a paragraph.

Figure 6C:
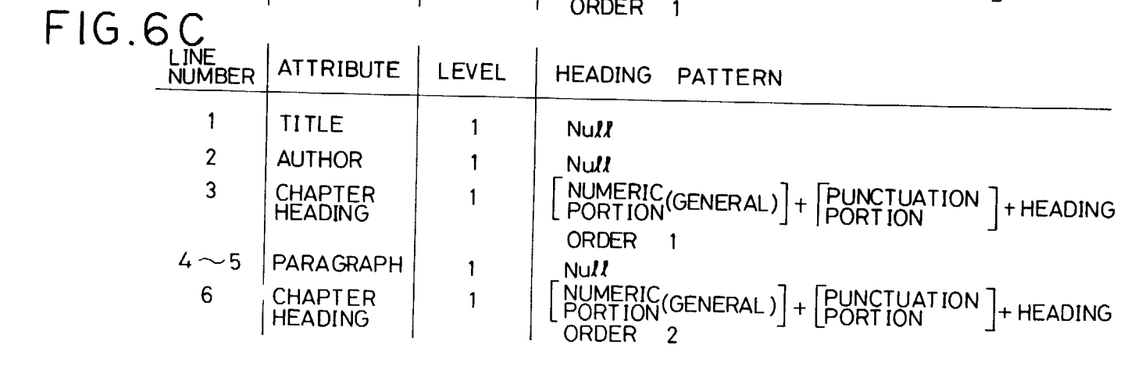
Figure 7B:
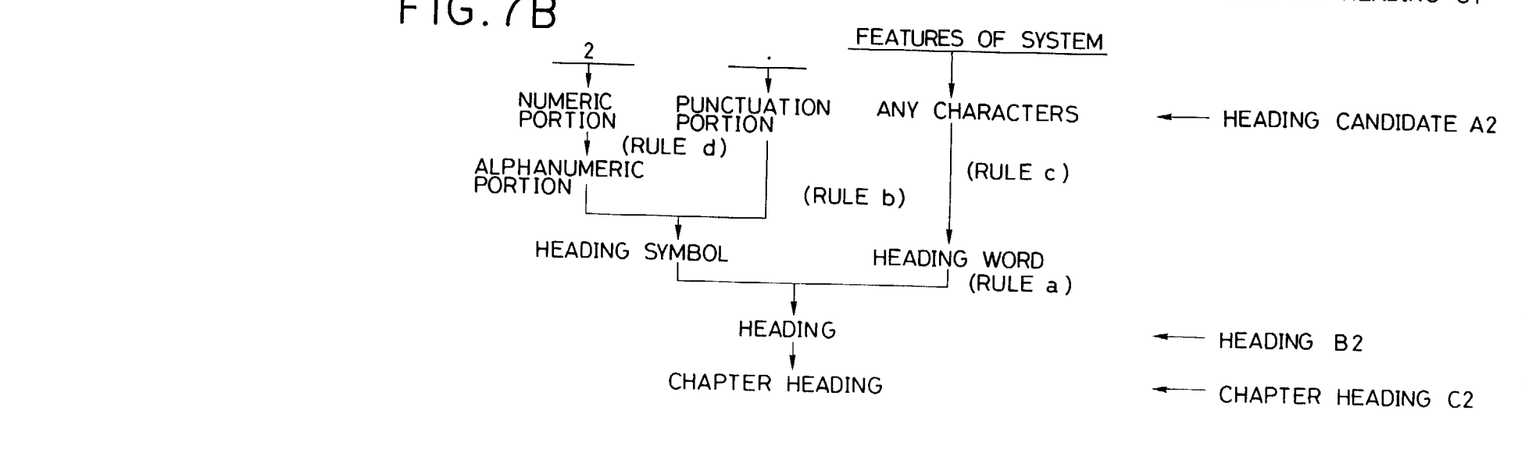

The sentence of the sixth line "2. Features of System" is recognized as heading candidate A2 in the same procedures as for heading candidate A1. In this case, the sentence of the sixth line is analyzed by the steps in FIG. 7B and is determined as being a heading B2. The heading B2 is compared with the rules in Table 2 to determine it coincides with a specific one of the rules. The heading B2 is defined by conditions (1-1), (2-1), (3-1), and (4-1), and is determined as having the possibility of being of the same level as that of chapter heading C1 "1. Introduction". In this way, it is determined whether the heading B2 is defined by the rules in Table 1. In other words, "2. Features of System" satisfies conditions (1), (1-1), (1-1-2), and (1-1-2-2-1), and thus, the heading word B2 is determined as constituting chapter heading C2. The resultant logical architecture data is stored in the storage 10 as shown in FIG. 6C.

Figure 6D:
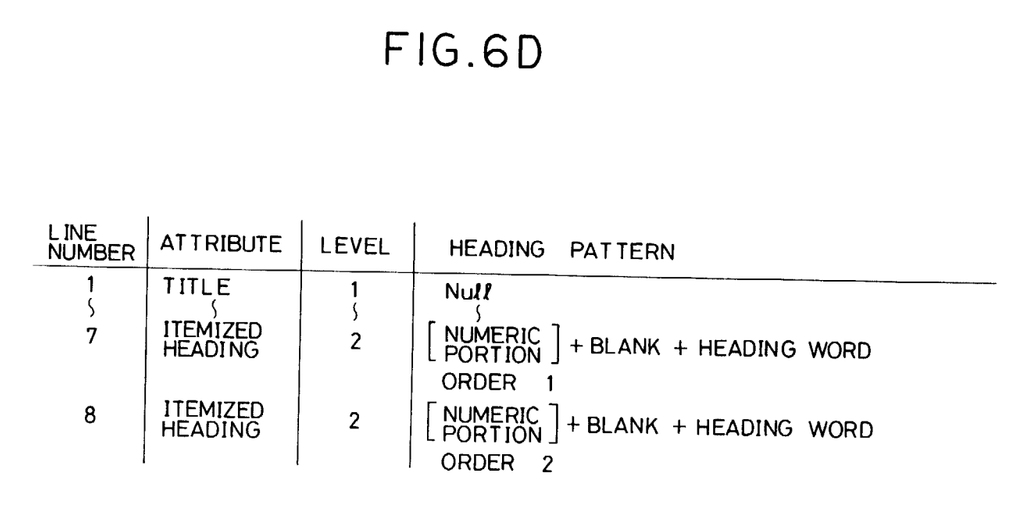
Figure 6E:
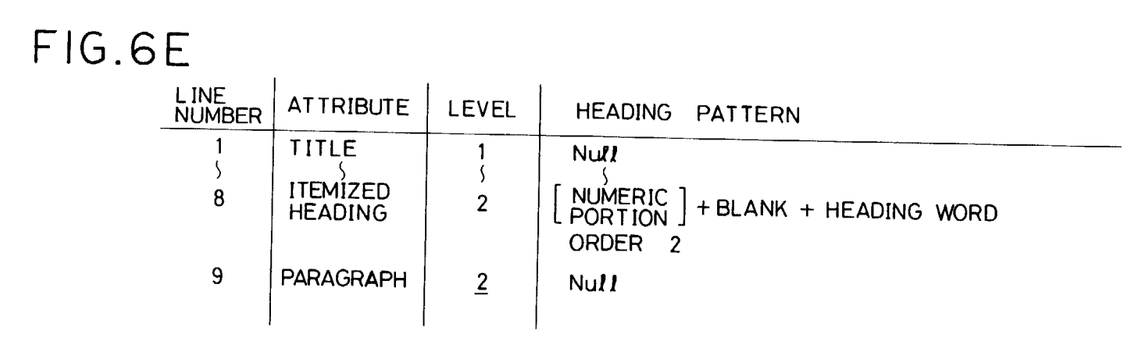
Figure 7C:
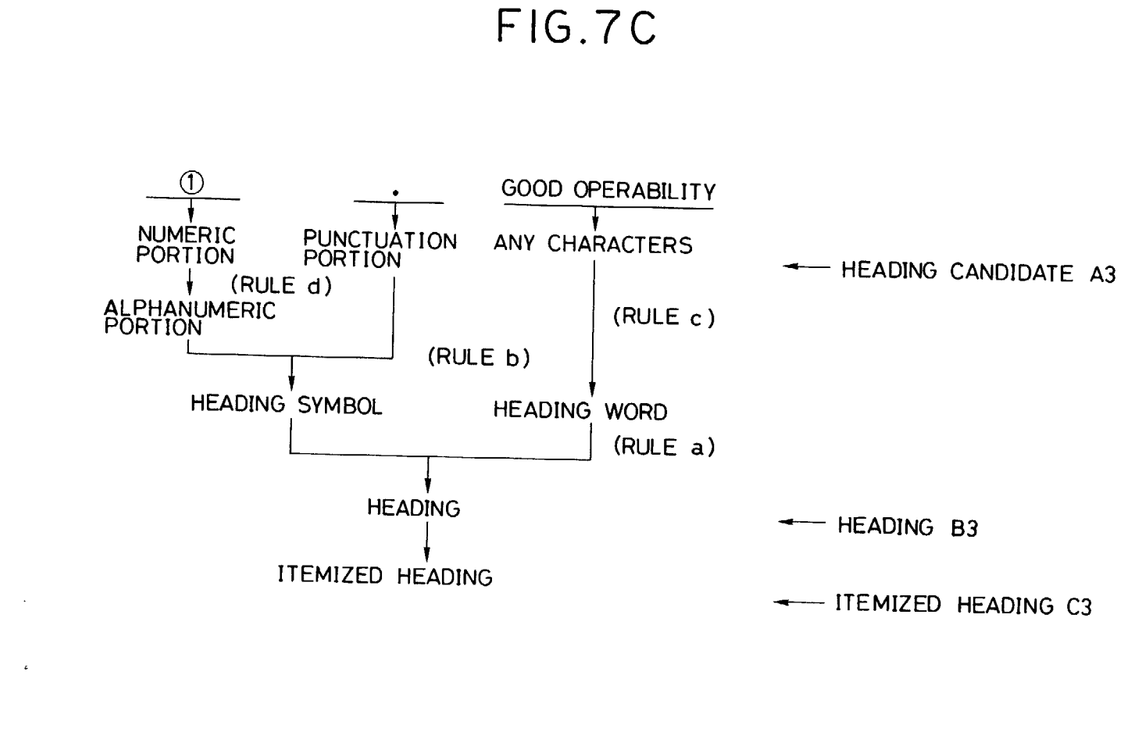

The same processing as described above is performed for the sentences of the seventh and subsequent lines, and the document architectures of these sentences are stored in the storage 10, as shown in FIGS. 6D and 6E. More specifically, for the sentence of the seventh line, heading candidate A3 is analyzed, as shown in FIG. 7C, and then is determined as being heading B3 according to the rules shown in FIGS. 4A to 4D.

In the document architecture decision section 9, the heading B3 is compared with the rules in Table 2. Since the pattern of heading B2 does not previously appear, matching is unsuccessful. As a result, heading B3 is determined as being a heading having a level different from those of the previous headings. Heading B3 is checked in accordance with document architecture rules in Table 1 and is found to coincide with conditions (1), (1-1), (1-1-2), (1-1-2-2), and (1-1-2-2-2-1). Therefore, heading B3 is determined as being itemizing heading C3.

Similarly, since the sentence of the eighth line satisfies conditions (1-1), (2-1), (3-1), and (4-1), the level of the heading corresponding to the sentence of the eighth line is determined as being possibly the same as that of the itemized heading of the seventh line. The sentence of the eighth line is determined as satisfying conditions (1), (1-1), (1-1-2), (1-1-2-2), (1-1-2-2-2), (1-1-2-2-2-2), and (1-1-2-2-2-2-1) in Table 1 and therefore determined as an itemized heading, being stored as shown in FIG. 6D.

With respect to the ninth line "This system is . . . ", it is possible to consider this paragraph as having two cases or two candidates. That is, the first case is that the ninth line is a part of the eighth line itemized heading or "2 High recognition rate", while the second case is that ninth line is a paragraph having the same level as that of the sixth line chapter heading or "2. Feature of System".

Therefore, in the apparatus according to the present invention, the apparatus is so configured as to allow the operator to select any one of the candidates.

To achieve the above-mentioned object, the apparatus further comprises a rule application decision section 12 and a candidate selection indication section 14 as depicted in FIG. 1.

The rule application decision section 12 is allowed to be accessible to the document architecture rule dictionary 9a to check a rule name requesting candidate selection and to retrieve flags corresponding to the rule name from a table (not shown) whenever two or more candidates are decided. The candidate selecting and indicating section 14 is accessible to a candidate selection key arranged in the document input device 2 to update flags so that any desired document architecture can be selected.

Figure 5:
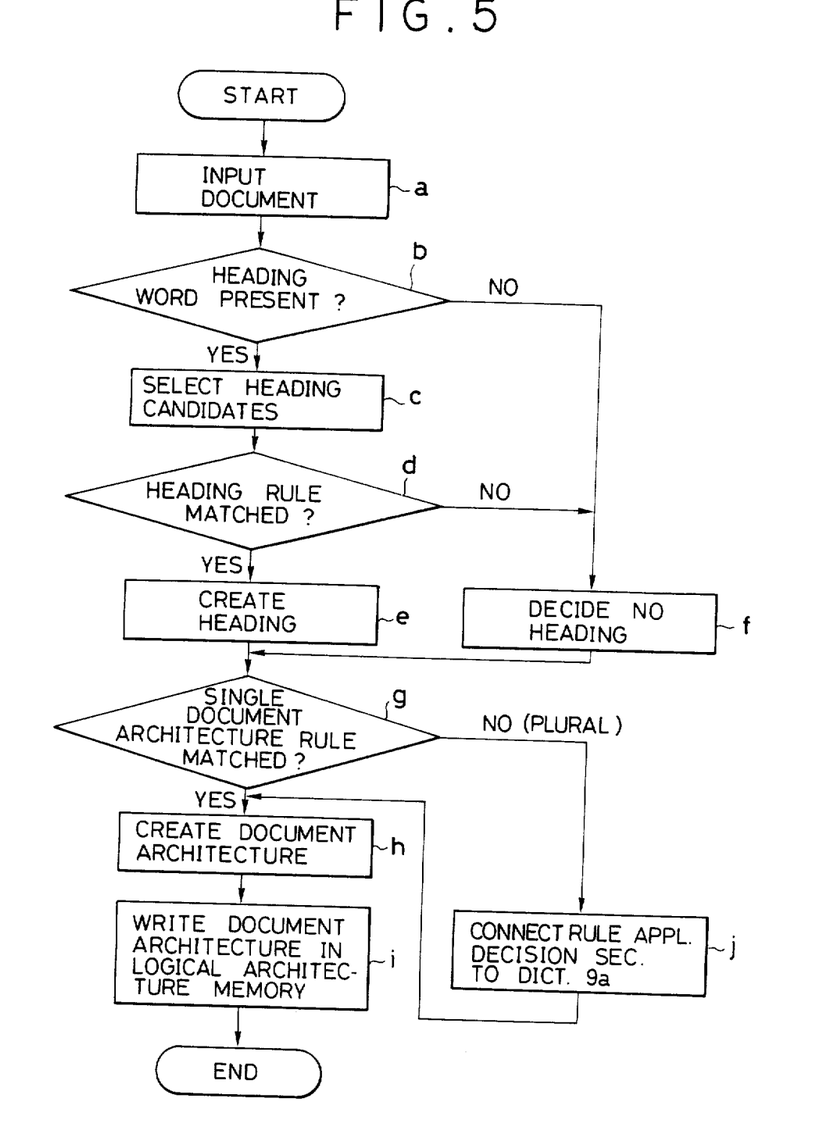
FIG. 5 is a flowchart showing the operation procedure of the apparatus shown in FIG. 1.

In FIG. 5, when a decided candidate does not match with a single document architecture rule or when plural candidates are created (in step g), control allows the rule application decision section 12 to be accessible to the document architecture rule dictionary 9a.

The above-mentioned candidate selection function is the feature of the present invention.

As already explained, the document architecture decision section 9 determines whether the sentence architectures correspond to the document architecture rules (Tables 1 to 4) stored in the document architecture rule dictionary 9a. In this case, there exists the case where the determined heading candidate word matches a plurality of rules and therefore it is impossible to univocally determine the document architecture. In this case, a plurality of artitecture candidates are written in the logical architecture storage 10 under the control of the document processor 1, and any one of the candidates is selected by the candidate selection indication section 14 and displayed on the display unit 5 under the control of the display controller 4.

Figure 6F:
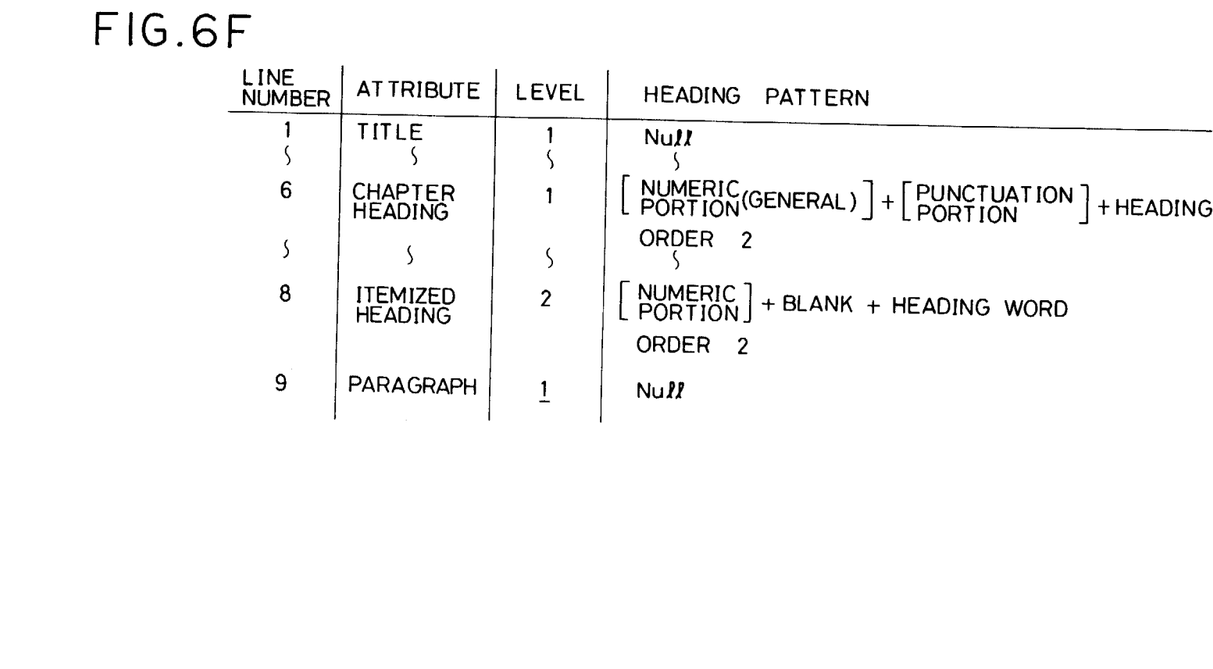
Figure 9:
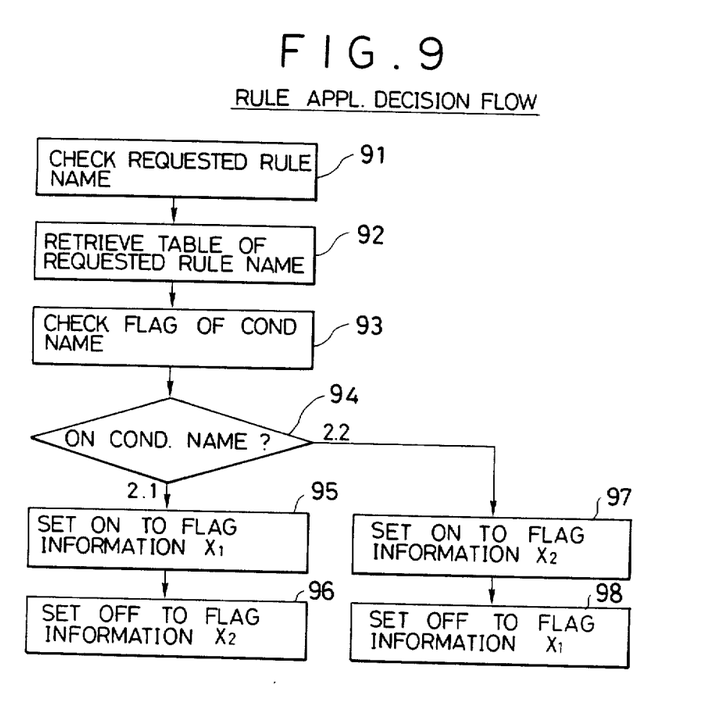
FIG. 9 is a flowchard showing a procedure of the operation of the rule application decision section.

The already-explained example of the ninth line shown in FIG. 2 will be described in further detail. The two architecture candidates are the case where "This system is . . . " is determined as a part of the eighth line itemized heading "②. High recognition rate" and the case where the same ninth line paragraph is determined as a paragraph having the same level as that of the sixth line chapter heading "2. Features of system". Since there exists no such rule as described above in the heading rule dictionary shown in FIG. 4, the above two sentences are recognized as "paragraph" in accordance with the document architecture rules shown in Table 4. Either of two paragraphs is written in the logical architecture storage 10 as shown in FIG. 6E or 6F, in accordance with the flow chart as shown in FIG. 9.

Figure 8:
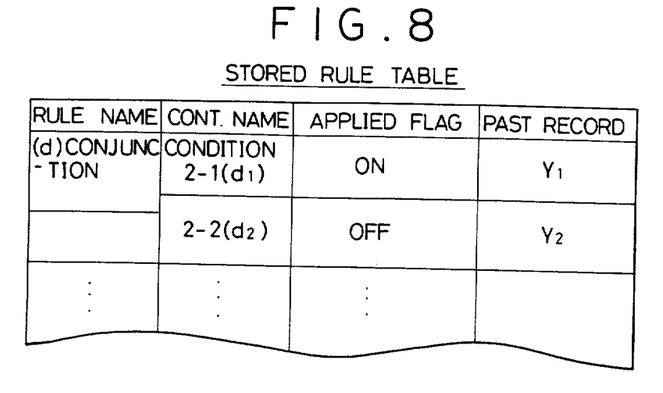
FIG. 8 shows an example of stored rule tables including flags corresponding to rule names.

More specifically, in this case, condition 1-1 in Table 4 matches, so that control requests the rule application decision section 12 to set an applied flag information as to which results $d_1$ or $d_2$ should be executed. In response to a request of the applied flag information setting, the section 12 checks from which rule the request is generated (step 91). In this case, since the request is generated from the rule (d), control retrieves applied flags corresponding to the above rule named from an application rule decision table as shown in FIG. 8 (step 92), and display the table on the display unit 5 so that the applied flags corresponding to the condition name can be checked (step 93). Here, if the rule 2-1 is required to be decided (step 94), the operator sets the flag information $X_1$ to ON (step 95) and the flag information $X_2$ to OFF (step 96).

By this, the condition (2-1) of Table 4 is selected to execute the result d1, so that the level of the current "paragraph" of the ninth line is determined as a part of the eighth line itemized heading, being written in the storage 10 as shown in FIG. 6E.

The above document architecture determined by the operator can be changed by the use of a candidate selection key arranged in the input device 2. That is, if the candidate selection key is depressed in the input device 2, the document processor 1 decodes the contents of the key and sends the information to the candidate selection indication section 14. This section 14 updates the applied flag in such a way that the flag is OFF in condition 2-1 but ON in condition 2-2 in the rule application table stored in the rule application decision section 12. Therefore, in the rule application decision section 12, ON is set to the applied flag information $X_2$ (step 97) and OFF is set to the applied flag information $X_1$ (step 98) so as to apply the condition 2-2, so that the result $d_2$ is executed and the paragraph of the ninth line is determined as the "paragraph" having the same level as that of the sixth line chapter heading shown in FIG. 2. Accordingly, the document architecture is rewritten in the logical architecture storage 10 as shown in FIG. 6F.

As described above, the rule to be applied can be switched by changing the application flag as explained above. In the above documents, any one of two candidates is selected. However, in the case of the presence of several candidates, it is possible to control the apparatus in such a way that application flags are turned on in sequence by repeatedly depressing the candidate selection key.

Additionally, in the present invention, rule application record information $y_1$, $y_2$. . . indicative of past rule application situations is added into the application rule table as shown in FIG. 8. That is, whenever a rule is selected by the operator, the rule application record information (including the number of times when a rule is applied and the state where a rule is applied) is updated, and further the selected rules are arranged in the table in the order of higher frequency information so as to be applicable in that order. Therefore, in the case of plural architecture candidates, it is possible to output the rules in the order of higher frequency or priority by the use of the candidate selection key, the above function being referred to as learning function.

In the above description, only a single architecture rule having plural candidates is selected according to the operator request. However, it is possible to configure the system so as to create plural document architecture candidates to plural architecture rules. In this case, the applied rule table is formed with a condition name, applied flags, and the rule application record information being classified into each of rules.

Further, as the method of operator's selecting of another logical architecture through the candidate selection key, it is possible to indicate a candidate sentence by a cursor or on the basis of various indications such as display reversal, high luminance under line, etc.

Further, the document architecture can be classified according to other forms different from the shown in FIG. 6.

Further, without being limited to the hierarchical classification of document headings, it is possible to apply the present invention to other data having a hierarchical architacture from the formal standpoint, such as an organization diagram, by modifying the heading decision rules and the document architecture decision rules, and data related thereto.

Furthermore, in the above embodiment, the above system handles Japanese document. However, without being limited thereto, it is possible to apply the present invention to the system which handles other foreign language documents by modifying the decision rules and the architecture decision rules so as to correspond to the language.

According to the present invention as described above, the input document data is segmented in units of sentences, and it is determined whether each sentence constitutes a heading. At the same time, the document rule of each sentence is decided. Therefore, the input document data can be effectively processed according to the logical document architectures.

The document processing described above is performed effectively. In other words, the heading, the level (hierarchical level) of the heading in the document, and the document architecture, such as the paragraphs preceded by the heading, are obtained effectively according to the input document data. It is thus possible to process the document in units of chapters or sections according to the logical achitectures, thereby greatly improving and simplifying document processing.

In addition, in the system according to the present invention, since the system can display some architecture candidates and the operator can select any one of them, it is unnecessary for the operator to amend the document architecture by using the editing functions.

Further, since the frequency information is added to each of the selected architecture candidates for providing a learning function, it is possible to increase the possibility of deciding any desired document architecture.

Further, when a higher priority value is previously set to the rule application record information of the rule to be applied, it is possible to first decide the most desired architecture candidate, in particular, in the case where the document has a specific document architecture as in a treatise.

Therefore, the system according to the present invention can efficiently form a document architecture and therefore can enhance the document forming efficiency.

What is claimed is:

1. A document processing apparatus comprising:
   processor means for controlling document processing operations;
   input means connected to said processor means, for inputting document data;
   heading dictionary storing means for storing words and phrases frequently used as headings arranged in a column direction;
   heading candidate extraction means connected to said processor means and said heading dictionary storing means, for extracting, as a heading candidate, one of a plurality of words and phrases, which corresponds to one of the headings stored in said heading dictionary storing means, from the document data input at said input means;
   heading rule dictionary means for storing rules used in determining the headings;
   heading deciding means connected to said processor means and said heading rule dictionary means, for checking whether the heading candidate extracted by said heading candidate extracting means is a heading or a non-heading according to the heading rules stored in said heading rule dictionary means;
   document architecture rule dictionary means for storing rules associated with document logical architectures; and
   document architecture deciding means connected to said processor means and said document architecture rule dictionary means, for deciding document logical architecture candidates of the heading by checking whether the heading and the non-heading decided by said heading deciding means is a chapter heading, a section heading or a paragraph, in accordance with the document architecture rules stored in said document architecture rule dictionary means;
   the apparatus further comprising document architecture selecting and indicating means for allowing an operator to select at least one desired document architecture when said document architecture deciding means decides a plurality of document architecture candidates in accordance with document architecture rules,
   wherein said document architecture selecting and indicating means comprises;
   (a) rule application deciding means accessible to said document architecture rule dictionary means when plural document logical architecture candidates are decided by said document architecture deciding means, for checking a rule name requesting candidate selection to retrieve flags corresponding to the rule name from an application rule table; and
   (b) candidate selecting and indicating means responsive to a candidate selecting key, provided in said document input means, for allowing the operator to update the flags by selecting at least one desired document architecture through the candidate selecting key, said document architecture rule dictionary means storing rule application record information indicative of past rule application situations and said document architecture deciding means deciding a document architecture rule to be applied with reference to the stored rule application record information in order to facilitate document architecture selection dependent upon a learning function.

2. The document processing apparatus set forth in claim 1, wherein said document architecture deciding means updates the rule application record information.

3. The document processing apparatus as set forth in claim 1, wherein the rule application record information includes the number of times when a rule is applied and states where a rule is applied.

* * * * *